(12) United States Patent
Phatak et al.

(10) Patent No.: US 7,839,324 B2
(45) Date of Patent: *Nov. 23, 2010

(54) EFFICIENT EPHEMERIS CODING

(75) Inventors: Makarand S. Phatak, Sunnyvale, CA (US); Gengsheng Zhang, Cupertino, CA (US); Marlene Wan, Sunnyvale, CA (US)

(73) Assignee: SiRF Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/694,653

(22) Filed: Mar. 30, 2007

(65) Prior Publication Data

US 2008/0191936 A1 Aug. 14, 2008

Related U.S. Application Data

(60) Provisional application No. 60/889,529, filed on Feb. 12, 2007.

(51) Int. Cl.
*G01S 1/00* (2006.01)
(52) U.S. Cl. .................................. 342/357.09
(58) Field of Classification Search ................
342/357.01–357.17, 355; 701/13, 213; 356/139.01
See application file for complete search history.

(56) References Cited

U.S. PATENT DOCUMENTS

| | | | | |
|---|---|---|---|---|
| 6,058,338 | A * | 5/2000 | Agashe et al. ............. | 701/13 |
| 6,211,819 | B1 * | 4/2001 | King et al. ............. | 342/357.09 |
| 6,323,803 | B1 * | 11/2001 | Jolley et al. ............. | 342/357.03 |
| 6,417,801 | B1 | 7/2002 | van Diggelen | |
| 6,606,346 | B2 | 8/2003 | Abraham et al. | |
| 6,651,000 | B2 | 11/2003 | van Diggelen et al. | |
| 6,704,651 | B2 | 3/2004 | van Diggelen | |
| 6,937,187 | B2 | 8/2005 | van Diggelen et al. | |
| 7,142,157 | B2 * | 11/2006 | Garin et al. ............. | 342/357.15 |
| 7,158,080 | B2 | 1/2007 | van Diggelen | |
| 7,336,224 | B2 * | 2/2008 | King et al. ............. | 342/357.06 |

(Continued)

FOREIGN PATENT DOCUMENTS

WO 02/12912 2/2002

(Continued)

OTHER PUBLICATIONS

Lelewer D A et al, "Data Compression", ACM Computing Surveys, ACM, NY, NY, vol. 19, No. 3 (Sep. 1, 1987) (pp. 261-296), SP 001051659, ISSN: 0360-0300.

*Primary Examiner*—Thomas H Tarcza
*Assistant Examiner*—Nga X Nguyen
(74) *Attorney, Agent, or Firm*—Haynes & Boone, LLP.

(57) ABSTRACT

In one embodiment, a system is provided that is operable to: predict satellite states using historical satellite state data for at least one satellite of a satellite-based positioning system; derive sets of parameters representative of the predicted satellite states; differentially compress the sets parameters into sets of compressed parameters; transmit the sets of compressed parameters to a client device over a first communication channel; uncompress the sets of compressed parameters into sets of recovered parameters; selectively reconstruct at least one reconstructed satellite state in the client device using the sets of recovered parameters; and determine the position of the client device using the at least one reconstructed satellite state along with timing information of satellite data received over a second communication channel.

15 Claims, 2 Drawing Sheets

U.S. PATENT DOCUMENTS

| | | |
|---|---|---|
| 2002/0188403 A1 | 12/2002 | LaMance et al. |
| 2004/0049326 A1* | 3/2004 | Diggelen et al. ............... 701/13 |
| 2005/0192745 A1* | 9/2005 | Abraham et al. ............ 701/213 |
| 2006/0055598 A1 | 3/2006 | Garin et al. |
| 2006/0187116 A1* | 8/2006 | Uozumi ................. 342/357.06 |
| 2007/0282910 A1* | 12/2007 | Diggelen et al. ......... 707/104.1 |

FOREIGN PATENT DOCUMENTS

| | | |
|---|---|---|
| WO | 2004/099813 | 11/2004 |

* cited by examiner

EFFICIENT EPHEMERIS CODING

RELATED APPLICATION

This application claims the benefit of U.S. Provisional Application No. 60/889,529, filed Feb. 12, 2007.

TECHNICAL FIELD

The disclosed embodiments relate to satellite based positioning systems and methods. More particularly, the disclosed embodiments relate to determining position without the use of ephemeris information in its broadcast form.

BACKGROUND

Satellite-based positioning systems include constellations of earth orbiting satellites that constantly transmit orbit information and ranging signals to receivers. An example of a satellite-based positioning system is the Global Positioning System (GPS), which includes a constellation of earth orbiting satellites, also referred to as GPS satellites, satellite vehicles, or space vehicles (SVs). The GPS satellites circle the earth twice a day in a very precise orbit and transmit signal information to the earth. The satellite signal information is received by GPS receivers which can be in portable or mobile units, or in fixed positions on base stations and/or servers.

The GPS receiver uses the satellite signal information to calculate the receiver's precise location. Generally the GPS receiver compares the time GPS signals or satellite signals were transmitted by a satellite with the time of receipt of that signal at the receiver. This time difference between satellite signal reception and transmission provides the receiver with information as to the range of the receiver from the transmitting satellite. Using pseudo-range measurements (pseudo because the range information is offset by an amount proportional to the offset between GPS satellite clock and receiver clock) from a number of additional satellites, the receiver can determine its position. The GPS receiver uses received signals from at least four satellites to calculate three-dimensional position (latitude, longitude, and altitude), or at least three satellites to calculate two-dimensional position (if altitude is known).

As GPS technology becomes more economical and compact it is becoming ever more common in consumer applications. For example, GPS systems are used for navigation in general aviation and commercial aircraft as well as by professional and recreational boaters. Other popular consumer uses of GPS include use in automobile navigation systems, construction equipment, and farm machinery as well as use by hikers, mountain bikers, and skiers, to name a few. Further, many location-based services are now available, such as asset tracking, turn-by-turn routing, and friend finding. Because GPS technology has so many consumer applications, it is finding increased popularity as an additional application hosted by a variety of portable electronic devices like personal digital assistants (PDAs), cellular telephones, and personal computers (PCs), to name a few. The popularity of GPS technology with consumers has resulted in an increased reliance on the position information provided to the consumer by GPS which, in turn, has resulted in a desire for GPS systems that provide reliable position information even when the GPS system is operating under less-than-ideal conditions.

The GPS satellite signals travel by line of sight, meaning they will pass through clouds, glass and plastic but will not get through most solid objects such as buildings and mountains. As a result, GPS receivers are generally usable everywhere except where it is impossible to receive an adequate satellite signal such as inside some buildings, in caves and other subterranean locations, and underwater. A GPS receiver, when determining position information, typically relies on information from the satellite signal, the absence of which makes position determination impossible. This satellite signal information includes a pseudorandom code along with ephemeris and almanac data to the receivers. The pseudorandom code is a code that identifies the satellite that is transmitting the corresponding signal and also helps the receiver to make ranging measurements. The almanac data tells the GPS receiver where each GPS satellite of the constellation should be at any time over a wide time interval that spans a few days or weeks. The ephemeris data does the same thing but much more accurately though over a much shorter time interval of a few hours.

The broadcast ephemeris (BE) data, which is continuously transmitted by each satellite, contains important information about the orbit of the satellite, and time of validity of this orbit information. In particular, the broadcast ephemeris data of a GPS satellite predicts the satellite's state over a future interval of approximately four hours. Broadcast ephemeris enables predictions of satellite position, velocity, clock bias, and clock drift. More particularly, the BE data describe a Keplerian element ellipse with additional corrections that then allow the satellite's position to be calculated in an Earth-centered, Earth-fixed (ECEF) set of rectangular coordinates at any time during the period of validity of the broadcast ephemeris data. Typically, the broadcast ephemeris data is essential for determining a position.

Because the broadcast ephemeris data is only valid for a four hour interval and is essential for position determination, a GPS receiver is required to collect new broadcast ephemeris data at such time as the receiver needs to compute the satellite state when the validity time for the previously-collected broadcast ephemeris data has expired. Broadcast ephemeris that is still valid may be referred to as "current" broadcast ephemeris. Current broadcast ephemeris data can be collected either as direct broadcast from a GPS satellite or re-transmitted from a server. However, there are situations under which it is not possible to collect new broadcast ephemeris data from GPS satellites or from a server. Examples of situations in which new broadcast ephemeris data cannot be collected include: a low signal strength of the satellite signals can prevent decoding/demodulating of the ephemeris data from the received satellite signal, the client can be out of coverage range of the server, and/or the server can be unavailable for a number of reasons, to name a few. When new broadcast ephemeris data is not available, the GPS receiver is typically unable to provide position information.

To address the need in the art for GPS receivers operable to determine satellite ephemeris without reception of current broadcast ephemeris, commonly-assigned U.S. Pat. No. 7,142,157 (the '157 patent) discloses a server that receives or collects historical state data of satellites for a satellite-based positioning system and numerically integrates the historical state data to provide predictions of satellite trajectories based upon the historical state data. These predicted satellite states may also be denoted as satellite ephemeris.

It will be appreciated by those of ordinary skill in the arts that the term "ephemeris" is then being used in its strict sense. Although it is conventional in the GPS arts to refer to the transmission of Kepler parameters by the GPS satellites as "broadcast ephemeris," Kepler parameters are not "true" satellite ephemeris but instead are parameters derived from satellite ephemeris. Because the reference to the conventional transmission of Kepler parameters from GPS satellites as "broadcast ephemeris" is a firmly-entrenched practice in the GPS arts, the results from a numerical integration of historical state data may be referred to as "predicted satellite states" or "extended ephemeris" to avoid confusion with parameters such as Kepler parameters that are merely derived from satellite ephemeris.

Having calculated the predicted satellite states, the server may transmit these states to client GPS-enabled devices. These client devices may then calculate current satellite ephemeris based upon the predicted satellite states. A time period spanned by the predicted satellite states depends upon the desired accuracy. For example, if +/−40 meter accuracy is acceptable, the predicted satellite states may correspond to every 15 minutes over a seven day period for all the satellites in the GPS constellation. To determine satellite states at a current time within this seven day period, the client device need then merely interpolate the relevant predicted satellite states about the current time. In this fashion, the client device needs relatively little processing power to determine current satellite states. However, considerable bandwidth and storage facilities must be dedicated to the transmission and storage of so many predicted satellite states.

Thus, the '157 patent discloses alternative embodiments in which the server does not generate predicted satellite states but rather parameters derived from these predicted satellite states such as Kepler parameters. A client device receives the Kepler parameters from the server and may thus predict satellite trajectories using the Kepler parameters. In this fashion, bandwidth demands for the transmission between the server and the client devices are reduced. However, the amount of data necessary for transmission may still strain bandwidth-limited connections between the server and the client GPS devices. For example, a full set of Kepler parameters valid for a four hour period for one satellite may comprise 422 bits. Six such sets of Kepler parameters to cover a 24 hour period for a satellite thus equals 422*6=2532 bits (or approximately 317 bytes). A complete day's transmission of Kepler parameters for the complete GPS constellation (twenty-seven space vehicles) thus requires 317*27=8449 bytes, which may prove to be too large to transmit over, for example, a bandwidth-limited wireless connection.

Accordingly, there is a need in the art for extended ephemeris solutions that lessen the bandwidth demands between a server of extended ephemeris data and its GPS client devices.

SUMMARY

In accordance with an aspect of the invention, a method for determining a position of a client device is provided that includes: predicting satellite states using historical satellite state data for at least one satellite of a satellite-based positioning system; deriving sets of parameters representative of the predicted satellite states; differentially compressing the sets parameters into sets of compressed parameters; transmitting the sets of compressed parameters to a client device over a first communication channel; uncompressing the sets of compressed parameters into sets of recovered parameters; selectively reconstructing at least one reconstructed satellite state in the client device using the sets of recovered parameters; and determining the position of the client device using the at least one reconstructed satellite state along with timing information of satellite data received over a second communication channel.

In accordance with another aspect of the invention, a client device is provided that includes: a communication system that receives sets of differentially-compressed parameters representative of predicted satellite states via a first communication channel, wherein the predicted satellite states are generated for future time periods using historical satellite state data for at least one satellite of a satellite-based positioning system; a state reconstructor that decompresses the differentially-compressed sets of parameters into recovered sets of parameters and selectively reconstructs at least one reconstructed satellite state using the recovered sets of parameters based upon a pre-determined period of validity for each recovered set of parameters; and at least one signal processor that uses the at least one reconstructed satellite state to acquire a satellite signal.

In accordance with another aspect of the invention, a server is provided that includes: a prediction generator operable to generates predictions of future satellite states for future time periods using historical satellite state data; a parameter generator operable to derive sets of parameters representative of the future satellite states and to differentially compress the sets parameters into compressed sets of parameters; and a communication system operable to transmit the compressed sets of parameters to client devices that use the transferred sets of parameters to selectively reconstruct at least one reconstructed satellite state.

BRIEF DESCRIPTION OF THE DRAWINGS

These figures are provided to assist in describing embodiments of the invention, and are not intended to be exclusive or limiting. In the figures, like reference numerals designate like elements.

DETAILED DESCRIPTION

In the following description, numerous specific details are introduced to provide a thorough understanding of, and enabling description for, embodiments of the positioning system. One skilled in the relevant art, however, will recognize that the positioning system can be practiced without one or more of the specific details, or with other components, systems, etc. In other instances, well-known structures or operations are not shown, or are not described in detail, to avoid obscuring aspects of the positioning system.

Devices and methods are described for determining satellite ephemeris without the use of broadcast ephemeris data for extended time periods. An extended ephemeris server collects historical state data of satellites of a satellite-based positioning system and generates predictions of future satellite trajectories (extended ephemeris) for a future predetermined time period. For example, a full set of extended ephemeris data may predict all the GPS satellite states for a predetermined period such as a seven day period. The extended ephemeris server then transmits the resulting extended ephemeris data to the GPS client devices. At any given time during the predetermined period of extended ephemeris validity, a GPS client device selects a set of extended ephemeris data appropriate to the given time from the full set of extended ephemeris data. The GPS client device may then generate satellite states for the given time from the selected set of extended ephemeris data and use the satellite states (in conjunction with pseudo-range calculations) to determine its position at the given time.

Figure 1:
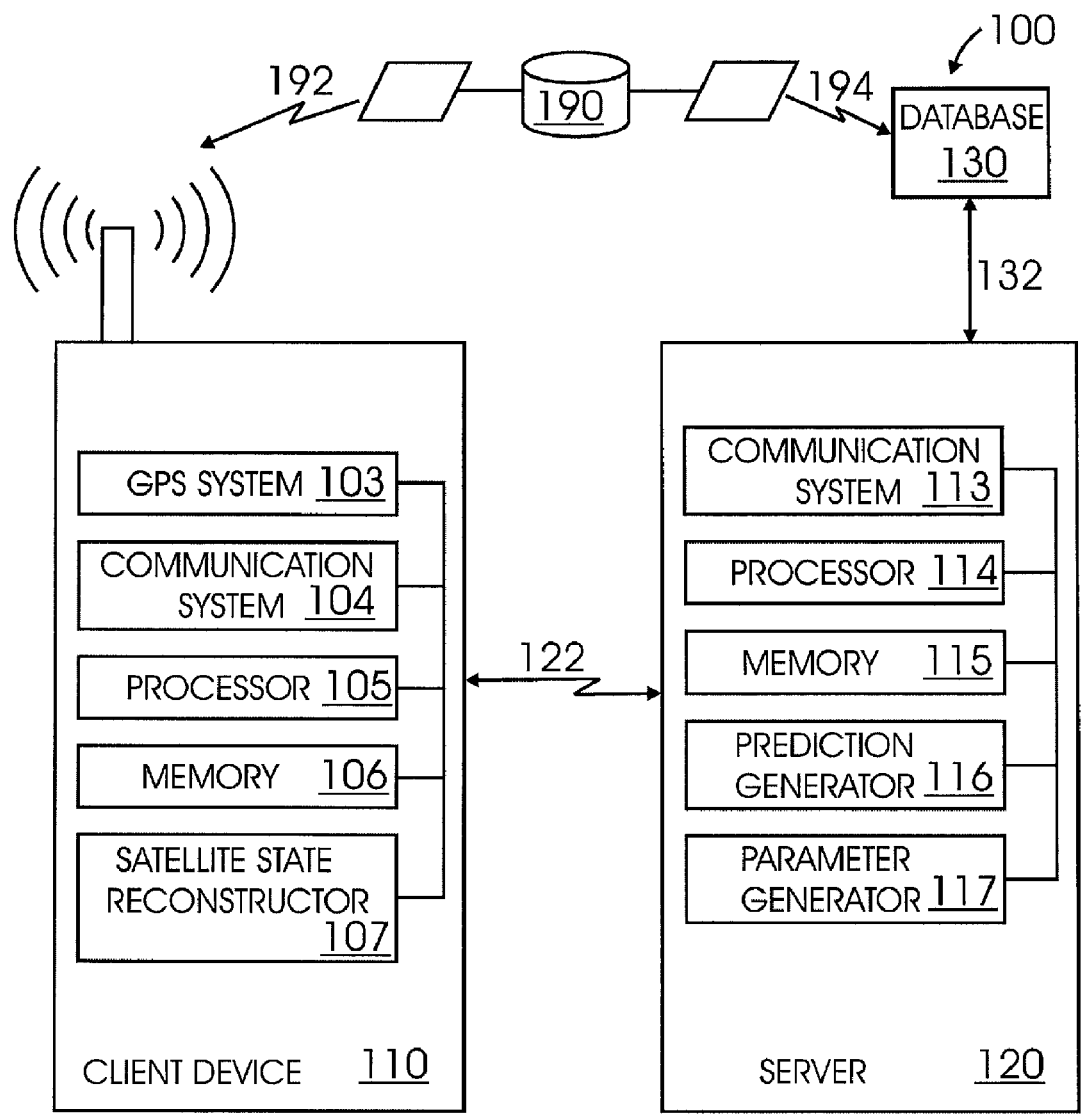
FIG. 1 is a block diagram of a system comprising client devices that provide position information without current ephemeris data using compressed parameters representative of predicted satellite states.

FIG. 1 is a block diagram of an exemplary system 100 comprising one or more GPS client devices 110 that may determine their position without the use of broadcast ephemeris (BE) data through the use of extended ephemeris data. System 100 includes at least one GPS client device 110 and at least one extended ephemeris server system 120 or network of servers 120, referred to herein as server 120. GPS client devices 110 receive information from GPS satellites 190 in view via GPS signals 192. GPS client devices 110 and extended ephemeris servers 120 communicate via at least one communication channel or link 122 which comprises wireless and/or wired couplings 122. To assist the transmission of ephemeris data over link 122, extended ephemeris server 120 may include a communication system 113, a processor 114, and a memory 115. Extended ephemeris server 120 of an embodiment also communicates with one or more databases 130 to request and/or receive data on past GPS satellite trajectories via at least one channel or link 132. Link 132 between servers 120 and databases 130 includes at least one of wireless and/or wired couplings. Link 132 of alternative embodiments can include one or more networks (not shown) having one or more network types.

GPS client devices 110 of an embodiment include but are not limited to portable communication devices, portable position tracking devices, cellular telephones, cellular telephones coupled to and/or integrated with position tracking devices, mobile electronic devices, mobile communication devices, personal computers (PCs), personal digital assistants (PDAs), and other processor-based devices. As one example, GPS client device 110 is a cellular telephone 110 and extended ephemeris server 120 is coupled to the cellular service provider's network such that communication link 122 is a wireless connection. As another example, GPS client device 110 is a PDA 110 and extended ephemeris server 120 is that of a GPS service provider such that communication link 122 is a wireless and/or wired connection using the Internet. These configurations are provided only as examples, and do not limit the embodiments described herein.

Generally, extended ephemeris server 120 of an embodiment predicts states of all GPS satellites 190 over a predetermined period of arbitrary duration. Extended ephemeris server 120, using historical information received from database 130, may generate the predictions by fitting parameters to a satellite's force model. The satellite force model is derived for each satellite using past trajectory data of the satellite.

In one embodiment, extended ephemeris server 120 may include a prediction generator 116 that predicts satellite states using historical satellite data from database 130. The historical trajectory or state data of database 130 includes mainly historical position state vectors of satellite trajectories and clock biases of satellites but can include other information. More specifically, the historical state data includes at least one of or some combination of satellite position state vectors, satellite velocity state vectors, satellite clock biases, and satellite clock rate errors. Database 130 can be a component of the server system 120, or can be a standalone server or system. Further, database 130 can be that of an appropriate provider of such historical information. One example of a provider from which the historical satellite information is received is the International GPS Service (IGS). Alternatively, the historical satellite data is generated and provided by components of the server 120.

These predicted satellite states span a future time period. As discussed previously, these predictions may take place by fitting parameters to a satellite's force model. The satellite force model is derived for each satellite using past trajectory data of the satellite. Once parameters are found that fit the force model, prediction generator 116 uses the fitted parameters in numerical integrations of differential equations of satellite dynamical motion from which predicted satellite states are generated periodically across a future period. The predicted satellite states include, but are not limited to, predictions of position state vectors of future satellite trajectories, velocity state vectors of future satellite trajectories, and future satellite clock biases and drifts for the satellites. In general, it will be appreciated that the extent of the future period spanned by the predicted satellite states depends upon the allowable error in the resulting predicted satellite states. For example, if a radial error of +/−40 meters is acceptable, conventional numerical integrations of satellite dynamical motion may be used to provide predicted satellite states that span a period of seven calendar days. Indeed, in the following discussion, it will be assumed that the spanned period is seven calendar days. However, the present invention is not limited to this particular spanned period and includes periods of varying scope. Furthermore, the periods between predicted satellite states (which may also be denoted as "sub-periods") is also arbitrary. In the following discussion, it will be assumed to be 15 minutes. These predictions are made for all the operating GPS satellites, which may equal thirty-two. It will thus be appreciated that prediction generator 116 may generate a fairly substantial number of predicted satellite states: 7 days*32 satellites*24 hours/day*(4 fifteen minute periods)/hr equals 21,504 predicted satellite states. It will thus be appreciated that the transmission of so many satellite states places substantial bandwidth demands upon communication channel 122 as well as requiring substantial memory space within a memory 106 in GPS client device 110.

To minimize these bandwidth demands, extended ephemeris server 120 may transmit parameters such as Kepler parameters derived from the predicated satellite states instead of the predicted states themselves. Accordingly, extended ephemeris server 120 may include a parameter generator 117. Although other types of parameters such as Chebyshev approximations may be used, the following discussion will assume that the parameters generated by parameter generator 117 are Kepler parameters. The resulting extended ephemeris data such as Kepler parameters is much compressed compared to the predicted satellite states. However, as also discussed previously, even this compression may still require the transmission of over eight thousand bytes to transmit all the Kepler parameters for all the GPS satellites for a one-day period.

To ease the bandwidth demands required to transmit Kepler parameters, parameter generator 117 may compress the Kepler parameters using, for example, a differential compression algorithm. To illustrate how such an algorithm operates, consider that each set of Kepler parameter has a limited period of validity. Conventionally, this period of validity is four hours. However, in one embodiment, it has been discovered that extending this period of validity to six hours introduces a relatively insignificant amount of error. Thus, the remaining discussion will assume that the period of validity of each set of Kepler parameters is six hours. A GPS client device 120 may thus require four sets of such Kepler parameters in each 24 hour period for each GPS satellite. These sets of Kepler parameters may be consecutively ordered from a first set that is valid for the first six hours in a first day of a seven day period to a twenty-eighth set that is valid for the last six hours of the seven day period. The first set of Kepler parameters is sent uncompressed but all the remaining sets are differentially compressed with regard to the preceding set. In general, for an arbitrary integer i, where $2 \leq i \leq 28$, the ith differentially-compressed set of Kepler parameters depends upon the difference for each parameter in the ith Kepler set as compared to the corresponding parameter in the (i−1)th set. The resulting compression depends upon the amount of this difference. If a given Kepler parameter changes little from set-to-set, the compression achieved by a differential compression scheme is dramatic. On the other hand, if virtually all the bits of a given Kepler parameter change from set-to-set, little or no compression is achieved by a differential compression scheme.

In general, the differential compression scheme may be perfect such that the original Kepler parameters may be determined in an error-free fashion from the differentially-compressed Kepler parameters. To achieve an error-free transmission, the variability of the Kepler parameters may be studied for a relatively long period of time such as several months or longer. The required number of bits for each differentially-compressed Kepler parameter will thus depend upon the variability seen over this period. The following table 1 compares the resulting number of bits for each differentially-compressed Kepler parameter as compared to the original Kepler parameters for an exemplary differential compression embodiment.

TABLE 1

| Parameter | Bits (Full) | Bits (delta) |
|---|---|---|
| toe = toc | 16 | 1 |
| $\sqrt{a}$ | 32 | 22 |
| $\Delta n$ | 16 | 13 |
| $M_0$ | 32 | 32 |
| e | 32 | 25 |
| $\omega$ | 32 | 27 |
| $C_{us}$ | 16 | 11 |
| $C_{uc}$ | 16 | 11 |
| $C_{rs}$ | 16 | 11 |
| $C_{rc}$ | 16 | 11 |
| $C_{is}$ | 16 | 10 |
| $C_{ic}$ | 16 | 10 |
| $i_0$ | 32 | 16 |
| di/dt | 14 | 13 |
| $\Omega_0$ | 32 | 29 |
| $\dot{\Omega}$ | 24 | 14 |
| af0 | 22 | 20 |
| af1 | 16 | 12 |
| af2 | 18 | 3 |
| tgd | 8 | 2 |
| Total | 422 | 293 |

As can be seen from this table, a set of uncompressed Kepler parameters may require a total of 422 bits to transmit. The number of bits for each differentially-compressed Kepler parameter (which may also be denoted as delta-encoded Kepler parameters) depends upon the variability between sets of Kepler parameters. For example, the toc parameter only changes at most one bit between consecutive sets such that it may be differentially encoded from an original 16 bits into just one bit. In contrast, the af0 parameter is much more variable in that may change 20 bits between consecutive sets such that it may only be compressed from an original 22 bits into a 20 bit compressed Kepler parameter.

The resulting differential compression scheme implemented by parameter generator 117 may be summarized as follows for a set of N consecutive Kepler parameters numbered from a first set to an Nth set;

1) Keep the first set of parameters uncompressed, where each set of parameters is valid for a sub-period of time corresponding to a predetermined period of time spanned by all the sets.

2) For the $2^{nd}$ to Nth sets, represent each current set as the delta values (difference) between the current set and (any of) the preceding sets Although any of the preceding sets may be used for this delta encoding, the following discussion will assume that the differentially encoding for a given set will depend upon the values of the immediately preceding set. Although the initial set is uncompressed, the resulting sets of parameters will be referred to as compressed Kepler parameters. Advantageously, significant bandwidth savings are thereby achieved. For example, each set of Kepler parameters may be considered valid for six hours such that four sets of Kepler parameters represents the satellite states for a given GPS satellite in a 24 hour period. From the preceding table, it may be seen that the number of bits necessary to represent the Kepler parameters for one satellite in a 24 hour period is 422+3*293=1301 bits, which equals approximately 163 bytes. To transmit extended ephemeris for a one day period for twenty-seven GPS satellites, server 120 may thus transmit merely 163 bytes*27=approximately 4401 bytes. This is almost one-half the number of bytes required if the Kepler parameters are sent uncompressed.

To aid the transmission of the initial uncompressed Kepler parameters and the subsequent differentially-compressed Kepler parameters, server communication system 113 includes components that interface with any number of wired/wireless communication channels to support communication with the client device 110 and any other system servers as well as other communication devices. As an example, communication system 113 includes components that provide at least one of cellular telephone communications and radio frequency (RF) communications using at least one of analog protocols and digital protocols, but other communication types/protocols can be supported as known in the art.

GPS client device 110 may obtain the parameters from server 120 in response to at least one of an appropriate request and/or from data broadcast by the server 120. Upon receiving the parameter data stream, GPS client device 110 need not communicate further with server 120 or any other source of ephemeris information. Based upon the differential encoding, client device 110 may first decompress the differentially-encoded Kepler parameters into their original uncompressed form. GPS client device 10 may then use the recovered Kepler parameters to reconstruct the predicted satellite trajectories which are subsequently used to generate satellite acquisition information and/or navigation solutions in a manner consistent with the use of ephemeris data. Accurate position fixes are generated by client device 110 using the predicted satellite trajectories that are valid for future time periods at least as long as one week, but the embodiment is not so limited. Use of the extended ephemeris by client device 110, in addition to removing a dependence on broadcast ephemeris data, also results in relatively improved performance in low Signal-to-Noise Ratio (SNR) environments and interference prone environments and improved time-to-first-fix (TTFF). Regardless of how client device reconstructs or synthesizes a satellite state, such states may be denoted as "new" satellite states to distinguish them from the predicted satellite states generated by server 120.

GPS client device 110 of an embodiment comprises a number of systems including at least one of a GPS system 103, communication system 104, processor 105, memory 106, and satellite state reconstructor 107. GPS system 103, communication system 104, memory 106, and satellite state reconstructor 107 of an embodiment run either autonomously or under control of processor 105, but are not so limited. GPS system 103 includes a receiver that receives information from GPS satellites 190 via GPS signals 192. The information received by GPS client devices 110 via GPS signals 192 includes a pseudorandom code along with broadcast ephemeris and almanac data, but is not so limited. The broadcast ephemeris and almanac data may not be demodulable if the signal-to-noise ratio (SNR) is too low. Advantageously, GPS client device 110 may continue to determine its position using standard GPS processing techniques even though broadcast ephemeris data is not demodulable such that broadcast ephemeris is replaced by reconstructed satellite states provided by satellite state reconstructor 107.

Communication system 104 includes components that interface with any number of wired/wireless communication channels and use any number of communication protocols to support communications between GPS client device 110 and extended ephemeris server 120 as well as other communication devices. As an example, communication system 104 includes components that provide at least one of cellular telephone communications and radio frequency (RF) communications using at least one of analog protocols and digital protocols, but other communication types/protocols are supported as known in the art.

Satellite state reconstructor 107 recovers the Kepler parameters as discussed herein. State reconstructor 107 may then use the appropriate set of Kepler parameters (depending upon the time a position is to be determined) to reconstruct satellite states. satellite state reconstructor 107 of an embodiment includes at least one of hardware, software, and firmware running under control of a processor 105 and/or other processors of GPS client device 110.

Processor 105 includes any collection of computing components, devices and software operating together, as is known in the art. Processor 105 can also be components or subsystems within a larger computer system or network. Processor 105 can also be coupled among any number of components (not shown) known in the art, for example other buses, controllers, memory devices, and data input/output (I/O) devices, in any number of combinations. Further, functions of processor 105 can be distributed across other components of GPS client device 110.

Communication links or channels 122, 132, 192, and 194 include at least one of wireless connections, wired connections, and trace connections. Communication links 122, 132, 192, and 194 also include couplings or connections to other systems as well as networks including local area networks (LANs), metropolitan area networks (MANs), wide area networks (WANs), proprietary networks, and proprietary or backend networks.

GPS client device 110 receives a data stream of compressed Kepler parameters (and the initial uncompressed set) from extended ephemeris server 120 using device communication system 104. The data stream is received in response to an appropriate electronic request from GPS client device 110 and/or from data broadcast by the server 120, but is not so limited. GPS client device 110 of some embodiments stores the received data in one or more memory areas 106, but is not so limited. Various components of GPS client device 110 subsequently use the reconstructed satellite state(s) along with other satellite data received from the satellites 190 to generate navigation solutions using known GPS signal processing methods. Accurate position fixes can be generated by GPS client device 110 for a period at least as long as one week using information of the compact satellite parameters instead of broadcast ephemeris data.

Each recovered set of Kepler parameters from state reconstructor 107 has a validity corresponding to a sub-period of the spanned time period. In one embodiment, the spanned time period is seven days and each sub-period is six hours. For a given time within this seven day period, satellite state reconstructor 107 may select the corresponding set of Kepler parameters that correspond to the sub-period that includes the given time. This selected set may then be used to recover the satellite states required for positition determination at the given time.

Extended ephemeris server 120 may transfer the compressed Kepler parameters in one or any other number of sets. Furthermore, the recovered Kepler parameters may be used to generate predictions without first being stored. Moreover, in yet other alternative embodiments, all predictions can be generated (upon receipt or following receipt) for the entire span of the future time period and then the predictions can be stored in client device memory.

In general, the period of time for which a given set of Kepler parameters is valid is a function of the forces on GPS satellites 190 and the quality of the curve fit using the Keplerian parameters. The forces on satellites 190, in descending order of importance, include: the gravitational field of the Earth; the gravitational field of the Moon; the gravitational field of the Sun; radiation pressure (sunlight absorbed/reflected from the satellite); thermal radiation from the satellite; outgassing from the satellite body; Earthshine (light reflected from the Earth); and the gravitational forces of Venus and Jupiter. As discussed above, it has been shown that the traditional validity of four hours for a set of Kepler parameters may be extended to six hours without significant error introduction.

The devices and methods described herein provide for the generation of accurate navigation solutions for extended periods of time without broadcast ephemeris data through use of accurate predictions of future satellite states. The predictions are generated using an accurate satellite state and force model that is derived from data of past satellite states. The use of past satellite states to generate the model produces a more accurate model that better accounts for the forces acting on the satellites, as described above. Use of a higher accuracy model reduces the propagation errors introduced by a model of relatively lower accuracy. It also helps reduce the curve fit error associated with the quasi-Keplerian parameters for the satellite orbit used in the ephemeris information. Upon identifying parameters that fit the force model, predictions of satellite states at future times are generated using a high-fidelity satellite dynamical motion model.

Figure 2:
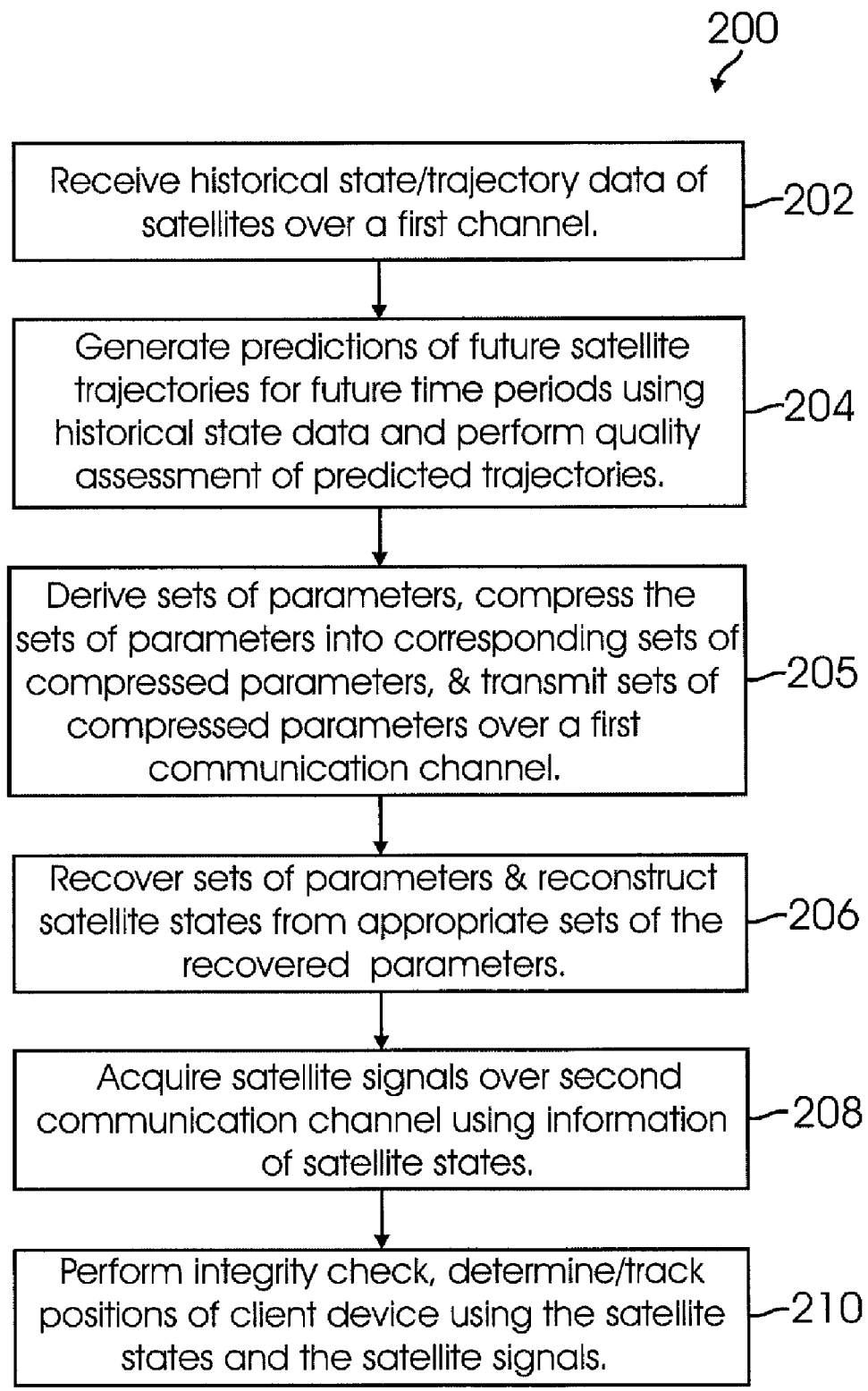
FIG. 2 is a flow diagram for determining position information using the system of FIG. 1.

The systems and devices described above operate under one or more methods as described below. FIG. 2 is a flow diagram 200 for determining position information without broadcast ephemeris data, under an embodiment. In operation, a processor-based extended ephemeris server receives or collects historical state or trajectory data (also referred to as historical data) that corresponds to the satellites of a satellite-based positioning system, at a block 202. The historical data is received over a first communication channel or link, for example a wired and/or wireless link to a data provider.

The server generates predictions of future satellite trajectories for future time periods using the historical data, and performs quality assessment of predicted trajectories, at a block 204. The server derives sets of parameters such as Kepler parameters from the predicted satellite states, differentially compresses the parameter sets, and transmits the compressed parameter sets over a first communication channel to the client device(s) at a block 205.

After recovering the parameter sets, the client device reconstructs the satellite states from an appropriate set of parameters for a time at which satellite states are required for acquisition and/or for navigation, at a block 206. The client device uses the satellite states selected at block 206 for acquisition of GPS satellite signals as appropriate to the current location and time of the client device, at a block 208. The GPS satellite signals are acquired and received via a second communication channel, but are not so limited. The client device may perform an integrity/consistency check, and determine and/or track its position using information of the satellite states and information of the satellite signals as appropriate to conventional GPS signal processing in a block 210.

The integrity/consistency checks may include receiver autonomous integrity monitoring (RAIM), for example. Alternative embodiments, however, can perform different integrity/consistency checks or may exclude the integrity/consistency checks.

In order to simplify the integrity or consistency checks performed on reconstructed satellite vectors, the server or client device of the various embodiments herein makes use of information of the Notice Advisory to NAVSTAR Users (NANU) retrieved, for example, via a network connection like the Internet. The NANU information includes advance information as to scheduled satellite non-availability (for maintenance purposes) or planned satellite maneuvers. Use of this NANU information allows for the exclusion of satellites from the predictions for which planned future actions (maintenance and/or maneuvers) would adversely impact reliability of the predictions.

Aspects of the positioning system of an embodiment may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the positioning system of an embodiment include: microcontrollers with memory (such as electronically erasable programmable read only memory (EEPROM)), embedded microprocessors, firmware, software, etc. Furthermore, aspects of the positioning system of an embodiment may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

The above description of illustrated embodiments of the positioning system and positioning methods is not intended to be exhaustive or to limit the embodiments to the precise form disclosed. While specific embodiments of, and examples for, the positioning system are described herein for illustrative purposes, various equivalent modifications are possible within the scope of the embodiments, as those skilled in the relevant art will recognize. The teachings of the positioning system provided herein can be applied to other electronic systems, not only for the electronic systems described above.

In general, in the following claims, the terms used should not be construed to limit the positioning system to the specific embodiments disclosed in the specification and the claims, but should be construed to include all electronic systems that operate under the claims to provide positioning information. For example, almanac data may be compressed by the server in an analogous fashion. The client devices would then recover the almanac data as discussed above with regard to the delta decoding of the compressed parameters. Accordingly, the positioning system is not limited by the disclosure, but instead the scope of the positioning system is to be determined entirely by the claims.

What is claimed is:

1. A method for determining a position of a client device, comprising:
   calculating predicted satellite states using historical satellite state data for at least one satellite of a satellite-based positioning system;
   deriving sets of Kepler parameters representative of the predicted satellite states, the sets being arranged from a first set to a last set;
   delta encoding the sets of parameters into sets of compressed parameters by, for each set of the parameters from a second one of the sets to the last set, determining a difference with regard to a preceding set to produce a corresponding compressed set;
   transmitting the sets of compressed parameters to a client device over a first communication channel;
   delta decoding the sets of compressed parameters into sets of recovered parameters;
   selectively reconstructing at least one reconstructed satellite state in the client device using one or more sets of the recovered parameters; and
   determining the position of the client device using the at least one reconstructed satellite state along with timing information of satellite data received over a second communication channel.

2. The method of claim 1, wherein the historical state data includes at least one of satellite position state vectors, satellite velocity state vectors, satellite clock biases, and satellite clock rate errors.

3. The method of claim 1, wherein the historical state data is received via at least one coupling with a database, wherein the historical state data is delivered to at least one server.

4. The method of claim 1, wherein the preceding set is an immediately-preceding set.

5. The method of claim 2, wherein the prediction of satellite states collectively covers a span of time having a length of at least seven calendar days.

6. The method of claim 1, wherein delta decoding the sets of compressed Kepler parameters comprises:
   for each set of compressed Kepler parameters from a second set to a last set, adding each compressed set with a subsequent compressed set to produce a corresponding set of Kepler parameters.

7. The method of claim 1, further comprising: analyzing historical state data to determine a statistical variation of the parameters in the sets of parameters, wherein the differentially encoding of the sets of parameters uses codewords having a bit length chosen according to the statistical variation.

8. The method of claim 1, wherein predicting satellite states using historical satellite state data comprises numerically integrating satellite equations of motion.

9. The method of claim 8, wherein each set of Kepler parameters is representative of the predicted satellite states for a period of at least four hours.

10. A client device, comprising:
    a communication system that receives sets of delta-encoded Kepler parameters representative of predicted satellite states via a first communication channel, wherein the predicted satellite states are generated for future time periods using historical satellite state data for at least one satellite of a satellite-based positioning system, and wherein the sets of delta-encoded Kepler parameters range from a first set to a last set;

a state reconstructor that delta decodes the delta-encoded sets of Kepler parameters into recovered sets of Kepler parameters and selectively reconstructs at least one reconstructed satellite state using the recovered sets of Kepler parameters based upon a predetermined period of validity for each recovered set of Kepler parameters, wherein the state reconstructor is configured to, for each set of delta-encoded Kepler parameters from a second set to the last set, add each delta-encoded set with a subsequent delta-encoded set to produce the recovered sets of Kepler parameters; and at least one signal processor that uses the at least one reconstructed satellite state to acquire a satellite signal.

11. The client device of claim 10, wherein the pre-determined period of validity is at least four hours.

12. The client device of claim 10, wherein the pre-determined period of validity is at least six hours.

13. A server, comprising:

a prediction generator operable to calculate predicted future satellite states for future time periods using historical satellite state data;

a parameter generator operable to derive sets of Kepler parameters representative of the future satellite states and to delta encode the sets of Kepler parameters into delta-encoded sets of Kepler parameters, wherein the Kepler parameters are arranged from a first set to a last set and wherein the parameter generator is configured to, for each set ranging from a second set to the last set, to determine a difference between the set and a preceding set to produce a corresponding delta-encoded set of Kepler parameters; and a communication system operable to transmit the delta-encoded sets of Kepler parameters to client devices that use the transferred sets of parameters to selectively reconstruct at least one reconstructed satellite state.

14. The server of claim 13, wherein the parameter generator is further operable to delta-encode the sets of Kepler parameters into delta-encoded sets of using codewords having a bit length chosen according to a statistical variation of the parameters.

15. The server of claim 13, wherein the communication system is operable to transmit the delta-encoded sets of Kepler parameters using a wireless communication channel.

* * * * *